(12) United States Patent
Seo et al.

(10) Patent No.: US 7,835,622 B2
(45) Date of Patent: Nov. 16, 2010

(54) RECORDING MEDIUM HAVING DATA STRUCTURE FOR MANAGING REPRODUCTION OF VIDEO DATA RECORDED THEREON AND RECORDING AND REPRODUCING METHODS AND APPARATUSES

(75) Inventors: Kang Soo Seo, Kyunggi-do (KR); Eun Sil Hyun, Seoul (KR); Jea Yong Yoo, Seoul (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1126 days.

(21) Appl. No.: 10/456,474

(22) Filed: Jun. 9, 2003

(65) Prior Publication Data

US 2004/0213105 A1 Oct. 28, 2004

(30) Foreign Application Priority Data

Jun. 21, 2002 (KR) ....................... 10-2002-0035010

(51) Int. Cl.
*H04N 5/91* (2006.01)
(52) U.S. Cl. .............................. 386/95; 386/96; 386/46; 386/125; 386/126
(58) Field of Classification Search .................... 386/83, 386/46, 95, 125, 45, 126
See application file for complete search history.

(56) References Cited

U.S. PATENT DOCUMENTS

| | | | |
|---|---|---|---|
| 5,521,898 A | 5/1996 | Ogasawara | |
| 5,583,652 A * | 12/1996 | Ware | 386/75 |
| 5,602,956 A | 2/1997 | Suzuki et al. | |
| 5,630,006 A | 5/1997 | Hirayama et al. | |
| 5,633,839 A | 5/1997 | Alexander et al. | |
| 5,691,972 A | 11/1997 | Tsuga et al. | |
| 5,734,788 A | 3/1998 | Nonomura et al. | |
| 5,742,569 A | 4/1998 | Yamamoto et al. | |

(Continued)

FOREIGN PATENT DOCUMENTS

CN 1205793 1/1993

(Continued)

OTHER PUBLICATIONS

International Search Report, Dated Aug. 29, 2003.

(Continued)

*Primary Examiner*—Jamie J Atala
(74) *Attorney, Agent, or Firm*—Harness, Dickey & Pierce, P.L.C.

(57) ABSTRACT

The data structure for managing reproduction of at least video data recorded on the recording medium may include, for example, path management information for managing reproduction of the multiple reproduction path video data recorded on the recording medium. The path management information indicates at least one playlist belonging to each reproduction path. The data structure further includes at least one playlist file identified by the path management information recorded in a playlist area of the recording medium. The playlist file identifies at least one playitem, and each playitem identifies a clip of the multiple reproduction path video data. The data structure may includes chapter management information for managing reproduction of the video data by chapters. In one example, the chapter management information is recorded in the playlist files.

18 Claims, 15 Drawing Sheets

U.S. PATENT DOCUMENTS

| | | | |
|---|---|---|---|
| 5,784,528 A | 7/1998 | Yamane et al. | |
| 5,796,910 A | 8/1998 | Nagano et al. | |
| 5,884,004 A * | 3/1999 | Sato et al. | 386/98 |
| 5,907,658 A * | 5/1999 | Murase et al. | 386/95 |
| 5,913,010 A | 6/1999 | Kaneshige et al. | |
| 5,917,781 A | 6/1999 | Kim | |
| 5,923,869 A | 7/1999 | Kashiwagi et al. | |
| 5,933,410 A | 8/1999 | Nakane et al. | |
| 5,953,290 A | 9/1999 | Fukuda et al. | |
| 5,999,694 A | 12/1999 | Yasuda et al. | |
| 5,999,698 A | 12/1999 | Nakai et al. | |
| 6,009,234 A | 12/1999 | Taira et al. | |
| 6,014,495 A | 1/2000 | Moriyama et al. | |
| 6,064,385 A | 5/2000 | Sturgeon et al. | |
| 6,064,796 A | 5/2000 | Nakamura et al. | |
| 6,067,400 A | 5/2000 | Saeki et al. | |
| 6,084,581 A * | 7/2000 | Hunt | 715/500.1 |
| 6,097,676 A | 8/2000 | Fujinami | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,215,746 B1 | 4/2001 | Ando et al. | |
| 6,219,488 B1 | 4/2001 | Mori et al. | |
| 6,247,022 B1 | 6/2001 | Yankowski | |
| 6,285,825 B1 | 9/2001 | Miwa et al. | |
| 6,292,226 B1 | 9/2001 | Yamanaka et al. | |
| 6,308,005 B1 * | 10/2001 | Ando et al. | 386/95 |
| 6,321,027 B2 | 11/2001 | Honji | |
| 6,336,002 B1 | 1/2002 | Yamauchi et al. | |
| 6,356,971 B1 | 3/2002 | Katz et al. | |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,392,969 B1 | 5/2002 | Heo | |
| 6,393,430 B1 | 5/2002 | Van Ryzin | |
| 6,415,101 B1 | 7/2002 | DeCarmo | |
| 6,424,793 B1 | 7/2002 | Setogawa et al. | |
| 6,424,797 B1 | 7/2002 | Murase et al. | |
| 6,532,334 B1 | 3/2003 | Kikuchi et al. | |
| 6,570,837 B1 | 5/2003 | Kikuchi et al. | |
| 6,580,870 B1 | 6/2003 | Kanazawa et al. | |
| 6,584,277 B2 | 6/2003 | Tsumagari et al. | |
| 6,615,192 B1 | 9/2003 | Tagawa et al. | |
| 6,647,496 B1 | 11/2003 | Tagawa et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 | 8/2004 | Tanaka et al. | |
| 6,795,499 B1 | 9/2004 | Kato et al. | |
| 6,798,981 B1 | 9/2004 | Yamauchi et al. | |
| 6,832,293 B1 | 12/2004 | Tagawa et al. | |
| 6,859,241 B2 | 2/2005 | Hamamoto et al. | |
| 6,904,227 B1 | 6/2005 | Yamamoto et al. | |
| 6,912,218 B1 | 6/2005 | Jeon | |
| 6,914,863 B2 | 7/2005 | Ono | |
| 6,915,067 B2 | 7/2005 | Tanaka et al. | |
| 6,965,727 B1 | 11/2005 | Sawabe et al. | |
| 6,999,674 B1 * | 2/2006 | Hamada et al. | 386/95 |
| 7,006,758 B1 | 2/2006 | Yamamoto et al. | |
| 7,050,384 B2 | 5/2006 | Sasaki | |
| 7,065,287 B1 * | 6/2006 | Heredia et al. | 386/52 |
| 7,113,694 B2 | 9/2006 | Kim et al. | |
| 7,236,687 B2 | 6/2007 | Kato et al. | |
| 7,565,060 B2 * | 7/2009 | Hamada et al. | 386/98 |
| 2001/0014070 A1 | 8/2001 | Ando et al. | |
| 2001/0026679 A1 | 10/2001 | Koshino et al. | |
| 2001/0030710 A1 | 10/2001 | Werner | |
| 2001/0036358 A1 | 11/2001 | Kim et al. | |
| 2001/0043790 A1 | 11/2001 | Saeki et al. | |
| 2001/0053280 A1 | 12/2001 | Yamauchi et al. | |
| 2002/0018416 A1 | 2/2002 | Heo | |
| 2002/0041557 A1 | 4/2002 | Heo | |
| 2002/0046328 A1 | 4/2002 | Okada | |
| 2002/0093556 A1 | 7/2002 | Ishizawa et al. | |
| 2002/0093886 A1 | 7/2002 | Ijichi et al. | |
| 2002/0106196 A1 | 8/2002 | Yamauchi et al. | |
| 2002/0126994 A1 * | 9/2002 | Gunji et al. | 386/83 |
| 2002/0129036 A1 | 9/2002 | Ho Yuen Lok et al. | |
| 2002/0135608 A1 | 9/2002 | Hamada et al. | |
| 2002/0145702 A1 | 10/2002 | Kato et al. | |
| 2002/0150383 A1 | 10/2002 | Kato et al. | |
| 2002/0159368 A1 | 10/2002 | Noda et al. | |
| 2002/0177914 A1 | 11/2002 | Chase | |
| 2002/0180803 A1 | 12/2002 | Kaplan et al. | |
| 2003/0035681 A1 | 2/2003 | Ho | |
| 2003/0058948 A1 | 3/2003 | Kelly et al. | |
| 2003/0103604 A1 | 6/2003 | Kato et al. | |
| 2003/0118327 A1 | 6/2003 | Um et al. | |
| 2003/0123346 A1 | 7/2003 | Ishii et al. | |
| 2003/0123845 A1 | 7/2003 | Koda et al. | |
| 2003/0147322 A1 | 8/2003 | Ono | |
| 2003/0161615 A1 | 8/2003 | Tsumagari et al. | |
| 2003/0235404 A1 | 12/2003 | Seo et al. | |
| 2004/0014136 A1 | 1/2004 | Ishii et al. | |
| 2004/0019396 A1 | 1/2004 | McMahon et al. | |
| 2004/0047588 A1 | 3/2004 | Okada et al. | |
| 2004/0047591 A1 | 3/2004 | Seo et al. | |
| 2004/0076402 A1 | 4/2004 | Jung et al. | |
| 2004/0114908 A1 | 6/2004 | Ito | |
| 2004/0120694 A1 * | 6/2004 | Hamada et al. | 386/95 |
| 2004/0156621 A1 | 8/2004 | Seo et al. | |
| 2004/0208135 A1 | 10/2004 | Nakamura et al. | |
| 2004/0213105 A1 | 10/2004 | Seo et al. | |
| 2004/0220791 A1 | 11/2004 | Lamkin et al. | |
| 2005/0019007 A1 | 1/2005 | Kato et al. | |
| 2005/0025459 A1 | 2/2005 | Kato et al. | |
| 2005/0036763 A1 | 2/2005 | Kato et al. | |
| 2006/0013564 A1 | 1/2006 | Hamada et al. | |
| 2006/0110132 A1 | 5/2006 | Takakuwa et al. | |
| 2006/0140079 A1 * | 6/2006 | Hamada et al. | 369/47.1 |
| 2006/0158969 A1 * | 7/2006 | Hamada et al. | 369/30.28 |
| 2006/0222340 A1 | 10/2006 | Yamauchi et al. | |

FOREIGN PATENT DOCUMENTS

| | | |
|---|---|---|
| CN | 1163673 | 10/1997 |
| CN | 1212427 | 3/1999 |
| CN | 1220458 | 6/1999 |
| CN | 1239574 | 12/1999 |
| CN | 1251680 | 4/2000 |
| CN | 1272209 | 11/2000 |
| CN | 1310445 | 8/2001 |
| CN | 1317200 | 10/2001 |
| CN | 1320926 | 11/2001 |
| CN | 1346491 | 4/2002 |
| CN | 1364387 | 8/2002 |
| CN | 1383679 | 12/2002 |
| CN | 1393872 | 1/2003 |
| CN | 1509572 | 6/2004 |
| CN | 1263345 | 9/2004 |
| CN | 1555058 | 12/2004 |
| CN | 1571055 | 1/2005 |
| CN | 1606355 | 4/2005 |
| CN | 1606357 | 4/2005 |
| CN | 1611071 | 4/2005 |
| CN | 1606356 | 5/2007 |
| EP | 0723216 | 7/1996 |
| EP | 0724264 | 7/1996 |
| EP | 0737009 | 10/1996 |

| | | |
|---|---|---|
| EP | 0831647 | 3/1998 |
| EP | 0836183 | 4/1998 |
| EP | 0836189 | 4/1998 |
| EP | 0911825 | 4/1998 |
| EP | 0858073 | 8/1998 |
| EP | 0872839 | 10/1998 |
| EP | 1024494 | 8/2000 |
| EP | 1050880 | 11/2000 |
| EP | 1103974 | 5/2001 |
| EP | 1126454 | 8/2001 |
| EP | 1041565 | 9/2001 |
| EP | 1148503 | 10/2001 |
| EP | 1041569 | 1/2002 |
| EP | 1198132 | 4/2002 |
| EP | 1198133 | 4/2002 |
| EP | 1 205 933 | 5/2002 |
| EP | 1 271 526 | 1/2003 |
| EP | 1280348 | 1/2003 |
| EP | 1391119 | 2/2004 |
| EP | 1398965 | 3/2004 |
| EP | 1469677 | 10/2004 |
| EP | 0949622 | 12/2006 |
| JP | 8-273304 | 10/1996 |
| JP | 09-135421 | 5/1997 |
| JP | 10-032780 | 2/1998 |
| JP | 10-40667 | 2/1998 |
| JP | 11-069308 | 3/1999 |
| JP | 11-069309 | 3/1999 |
| JP | 11-096653 | 4/1999 |
| JP | 11-120747 | 4/1999 |
| JP | 11-161663 | 6/1999 |
| JP | 11-213522 | 8/1999 |
| JP | 11-213627 | 8/1999 |
| JP | 11-259985 | 9/1999 |
| JP | 11-296997 | 10/1999 |
| JP | 2000-021130 | 1/2000 |
| JP | 2000-067522 | 3/2000 |
| JP | 2000-149405 | 5/2000 |
| JP | 2000-195235 | 7/2000 |
| JP | 2000-222822 | 8/2000 |
| JP | 2000-235779 | 8/2000 |
| JP | 2000-235780 | 8/2000 |
| JP | 2000-322827 | 11/2000 |
| JP | 2000-331466 | 11/2000 |
| JP | 2000-348442 | 12/2000 |
| JP | 2001-024985 | 1/2001 |
| JP | 2001-157145 | 6/2001 |
| JP | 2001-157208 | 6/2001 |
| JP | 2001-169246 | 6/2001 |
| JP | 3199243 | 6/2001 |
| JP | 2001-195809 | 7/2001 |
| JP | 2001-332006 | 11/2001 |
| JP | 2001-359072 | 12/2001 |
| JP | 2002-025231 | 1/2002 |
| JP | 2002-082838 | 3/2002 |
| JP | 2002-083486 | 3/2002 |
| JP | 2002-112201 | 4/2002 |
| JP | 2002-150685 | 5/2002 |
| JP | 2002-158972 | 5/2002 |
| JP | 2002-158974 | 5/2002 |
| JP | 2002-222581 | 8/2002 |
| JP | 2002-352515 | 12/2002 |
| JP | 3392838 | 1/2003 |
| JP | 3392849 | 1/2003 |
| JP | 2003-68057 | 3/2003 |
| JP | 2003-199047 | 7/2003 |
| JP | 2003-520514 | 7/2003 |
| JP | 3379961 | 12/2003 |
| JP | 2004-127397 | 4/2004 |
| JP | 2005-513936 | 5/2005 |
| JP | 2005-251392 | 9/2005 |
| KR | 1996-0038743 | 11/1996 |
| KR | 1996-0038744 | 11/1996 |
| KR | 1996-0038901 | 11/1996 |
| KR | 1996-0038905 | 11/1996 |
| KR | 1999-0022858 | 10/1997 |
| KR | 1999-0079482 | 11/1999 |
| KR | 2000-0053633 | 8/2000 |
| KR | 2001-0022702 | 3/2001 |
| KR | 2001-0028735 | 4/2001 |
| KR | 2001-0051898 | 6/2001 |
| KR | 2001-0098007 | 11/2001 |
| KR | 2001-0107578 | 12/2001 |
| KR | 2002-0006273 | 1/2002 |
| KR | 2002-0020919 | 3/2002 |
| KR | 2002-0097454 | 12/2002 |
| KR | 2002-0097455 | 12/2002 |
| WO | WO 97/13366 | 4/1997 |
| WO | WO 97/14151 | 4/1997 |
| WO | WO 97/15924 | 5/1997 |
| WO | WO 97/37491 | 10/1997 |
| WO | WO 97/38527 | 10/1997 |
| WO | WO 97/39451 | 10/1997 |
| WO | WO 99/08281 | 2/1999 |
| WO | WO 99/38169 | 7/1999 |
| WO | WO 00/05883 | 2/2000 |
| WO | WO 00/46803 | 8/2000 |
| WO | WO 00/60597 | 10/2000 |
| WO | WO 01/35648 | 5/2001 |
| WO | WO 01/52554 | 7/2001 |
| WO | WO 01/82604 | 11/2001 |
| WO | WO 01/82606 | 11/2001 |
| WO | WO 01/82610 | 11/2001 |
| WO | WO 01/82611 | 11/2001 |
| WO | WO 02/075739 | 9/2002 |
| WO | WO 02/080541 | 10/2002 |
| WO | WO 03/047261 | 6/2003 |
| WO | WO 03/058957 | 7/2003 |
| WO | WO 04/001728 | 12/2003 |
| WO | WO 04/001750 | 12/2003 |
| WO | WO 04/001752 | 12/2003 |
| WO | WO 04/001753 | 12/2003 |
| WO | WO 04/001754 | 12/2003 |
| WO | WO 2004/032142 | 4/2004 |
| WO | WO 2004/047100 | 6/2004 |
| WO | WO 2004/088661 | 10/2004 |

OTHER PUBLICATIONS

Office Action for corresponding Japanese application dated May 7, 2008.
Office Action for corresponding Japanese application dated Jun. 20, 2008.
Office Action for corresponding Japanese application dated Jun. 27, 2008.
Office Action for corresponding Japanese application dated May 20, 2008.
European Search Report dated Sep. 12, 2008 for corresponding Application No. 04708081.7-2223.
Office Action for corresponding Japanese Application No. 2004-553264 dated Sep. 16, 2008.
Office Action for corresponding Australian Application No. 2003-240036 dated Sep. 11, 2008.
Office Action for corresponding Australian Application No. 2003-228113 dated Sep. 17, 2008.
Office Action for corresponding Australian Application No. 2003-241205 dated Sep. 11, 2008.
International Search Report dated Jun. 16, 2009 received from the European Patent Office.

* cited by examiner

FIG. 6

*info.ttl (or \*.ttl) - syntax*

| info.ttl { |
|---|
| version_number |
| TableOfPlayLists_start_address |
| reserved_for_future_use |
| ⋮ |
| TableOfPlayLists(){ |
|     length |
|     number_of_PlayLists |
|     for(I=0; i<number_of_PlayLists; i++){ |
|         PlayList_file_name |
|         Chapter_entry_flag |
|         Path_number |
|     } |
| } |
| ⋮ |

FIG. 7

| ⋮ |
|---|
| ChapterEntryTable(){ |
|     length |
|     number_of_Chapters |
|     for(I=0; i<number_of_Chapters; i++){ |
|         Entry_PlayList_file_name |
|     } |
| } |
| ⋮ |

FIG. 12

*info.ttl (or \*.ttl) - syntax*

| info.ttl { |
|---|
| version_number |
| TableOfPlayLists_start_address |
| reserved_for_future_use |
| ⋮ |
| TableOfPlayLists(){ |
| length |
| number_of_PlayLists |
| for(I=0; i<number_of_PlayLists; i++){ |
| PlayList_file_name |
| Path_number |
| } |
| } |
| ⋮ |

FIG. 14

*.rpls - syntax

| xxxxx.rpls { |
|---|
| version_number |
| . . . . . . . |
| PlayListsMark(){ |
| length |
| number_of_PlayList_marks |
| for(I=0; i<number_of_PlayList_marks; i++){ |
| . . . . . . . |
| mark_type      ●——— *0x05 (Chapter-mark)* |
| maker_ID |
| ref_to_PlayItem_id |
| mark_time_stamp |
| duration |
| . . . . . . . |
| : |

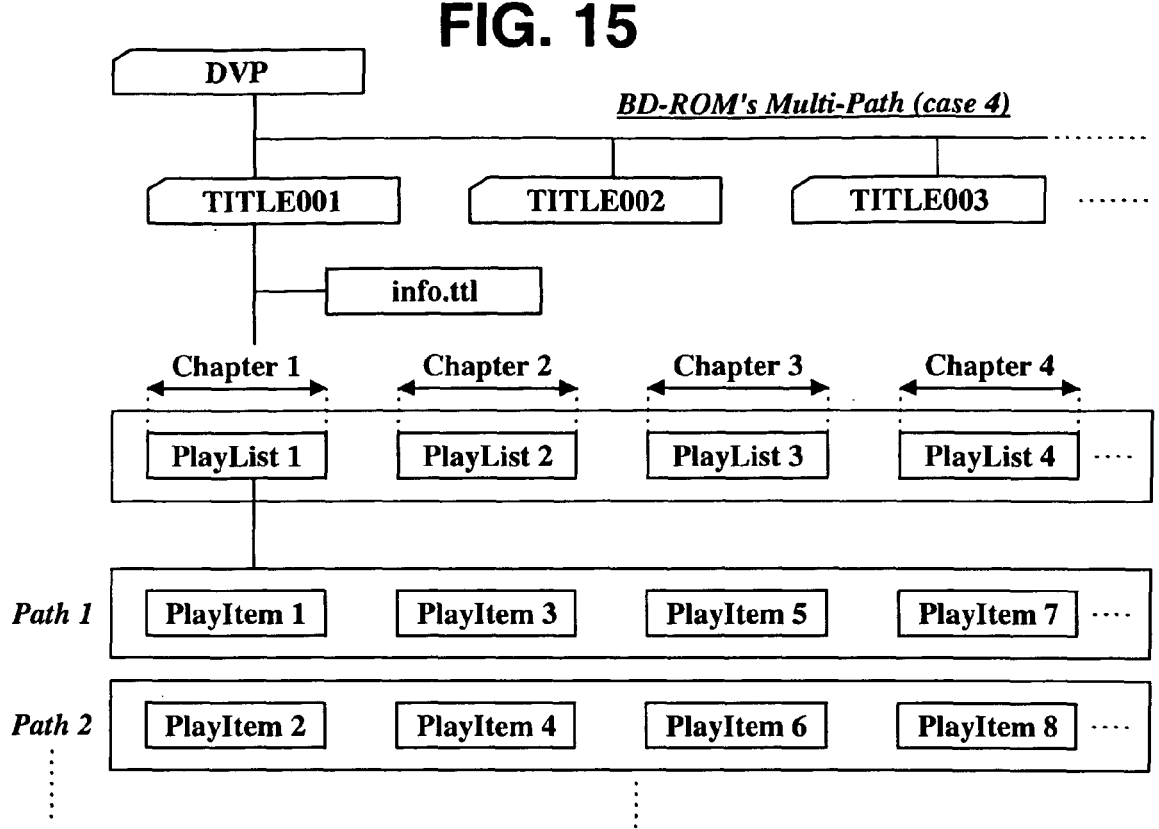

RECORDING MEDIUM HAVING DATA STRUCTURE FOR MANAGING REPRODUCTION OF VIDEO DATA RECORDED THEREON AND RECORDING AND REPRODUCING METHODS AND APPARATUSES

BACKGROUND OF THE INVENTION

1. Field of the Invention

The present invention relates to a recording medium having a data structure for managing reproduction of at least video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

FIG. 1 illustrates the file structure of the BD-RW. The file structure or data structure provides for managing the reproduction of the video and audio data recorded on the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips.

The CLIPINF directory includes a clip information file associated with each A/V stream file. The clip information file indicates, among other things, the type of A/V stream associated therewith, number of source packets in the A/V stream associated therewith, and timing information of the source packets in the A/V stream associated therewith (e.g., on an arrival time basis (ATC) and/or a system time basis (STC)).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., ATC or STC basis). Expressed another way, the playlist file identifies playitems, each playitem points to a clip or portion thereof and identifies the clip file associated with the clip.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdtl and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The data structure of the present invention may have an architecture that provides for managing the reproduction of at least video data. For example, path management information for managing reproduction of multiple reproduction path video data may be provided on the recording medium. In one exemplary embodiment, the path management information indicates at least one playlist file belonging to each reproduction path. A playlist area of the recording medium includes at least one playlist file identified by the path management information. The playlist file identifies at least one playitem, and each playitem identifies a clip of the multiple reproduction path video data. In another exemplary embodiment, the playlist file may include path management information.

The data structure according to the present invention may include chapter management information for managing reproduction of the video data by chapter. In one exemplary embodiment, the chapter management information includes playlist marks in the playlist file or files. A playlist mark indicates whether the playlist mark serves as a chapter mark and may also indicate the playitem in which the playlist mark is placed. In another exemplary embodiment, the chapter management information includes a chapter entry flag associated with each playlist identified in the general information file, where the chapter entry flag indicates whether the playlist begins a chapter. In another exemplary embodiment, the chapter management information includes a chapter entry flag associated with each playitem in a playlist, where the chapter entry flag indicates whether the playitem begins a chapter.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which:

FIGS. 5-7 illustrate a first detailed embodiment of a file or data structure according to FIG. 2;

FIGS. 9-12 illustrate a second detailed embodiment of a file or data structure according to FIG. 2;

FIGS. 13-14 illustrate a third detailed embodiment of a file or data structure according to FIG. 2;

FIGS. 15-17 illustrate a fourth detailed embodiment of a file or data structure according to FIG. 2;

DESCRIPTION OF THE PREFERRED EMBODIMENTS

In order that the invention may be fully understood, preferred embodiments thereof will now be described with reference to the accompanying drawings.

Figure 1:
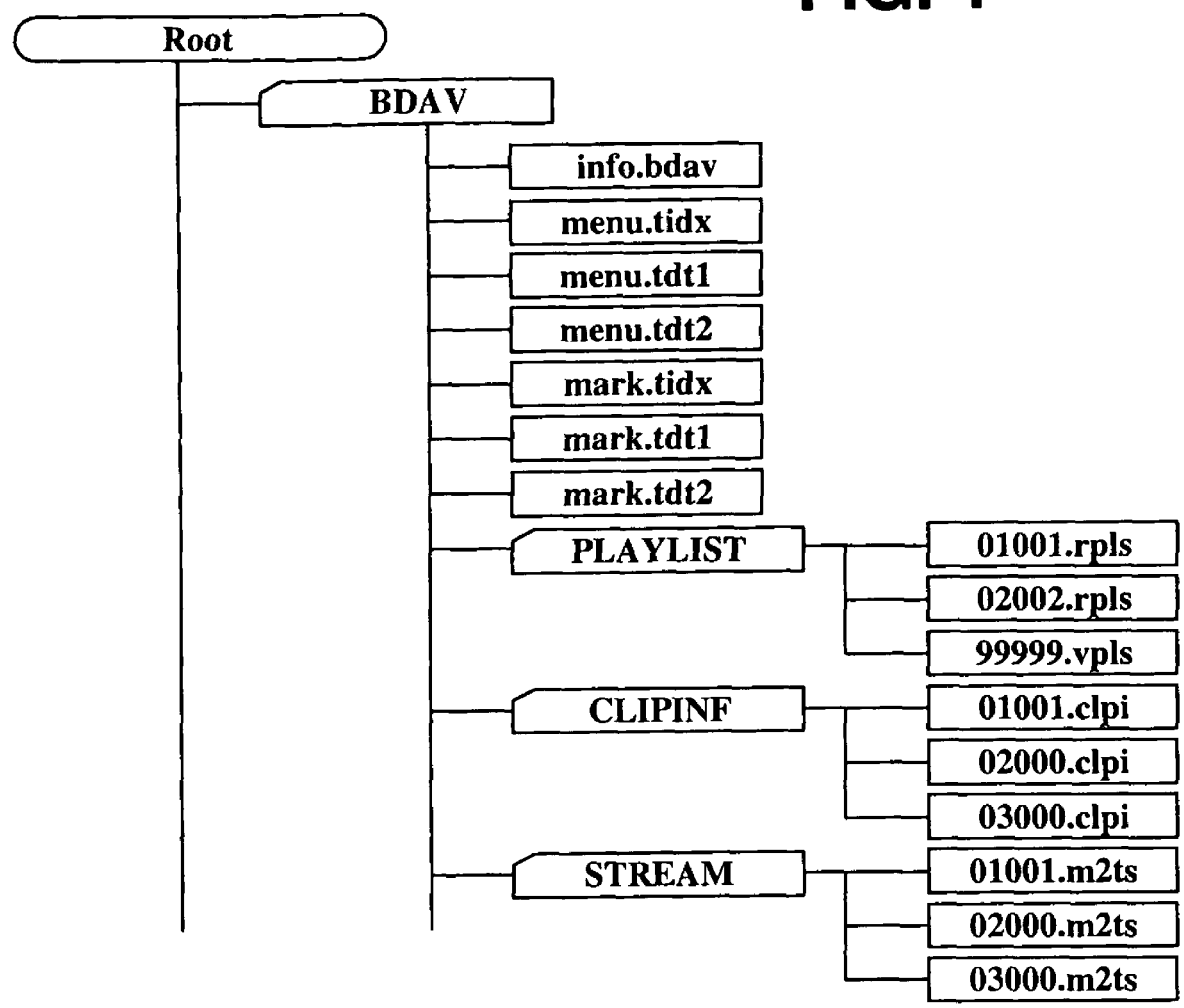
FIG. 1 illustrates the prior art file or data structure of a rewritable optical disk according to the Blu-ray Disc Rewritable (BD-RW) standard.
Figure 2:
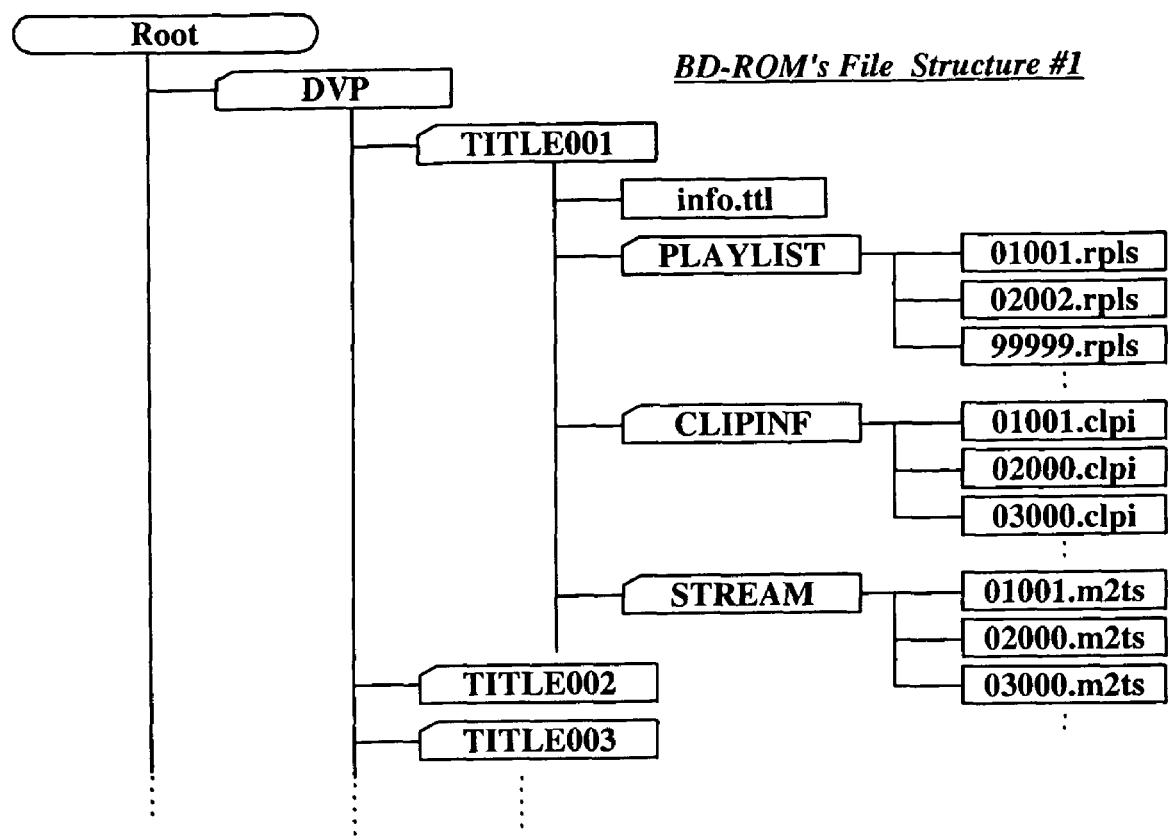
FIGS. 2 and 4 illustrate two exemplary embodiments of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes title directories TITLE001 TITLE002, TITLE003, etc. for each title of audio and video (A/V) data recorded on the recording medium (e.g., BD-ROM). Each TITLE directory includes a general information file 'info.ttl', a PLAYLIST directory in which playlist files (e.g., real (*.rpls) and virtual (*.vpls)) for the title are stored, a CLIPINF directory in which clip information files (*.clpi) for the title are stored, and a STREAM directory in which MPEG2-formatted A/V stream clip files (*.m2ts), corresponding to the clip information files, for the title are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips.

The CLIPINF directory includes a clip information file associated with each A/V stream file. The clip information file indicates, among other things, the type of A/V stream associated therewith, number of source packets in the A/V stream associated therewith, and timing information of the source packets in the A/V stream associated therewith (e.g., on an arrival time basis (ATC) and/or a system time basis (STC)).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., ATC or STC basis). Expressed another way, the playlist file identifies playitems, each playitem points to a clip or portion thereof and identifies the clip file associated with the clip.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.ttl file is a general information file that provides general information for managing the reproduction of the A/V streams for the associated title recorded on the optical disk. More specifically, the info.ttl file includes, among other things, a table of playlists that identifies the file names of the playlists in the PLAYLIST directory of the same title directory. The info.ttl file will be discussed in greater detail below with respect to the embodiments of the present invention.

Figure 3:
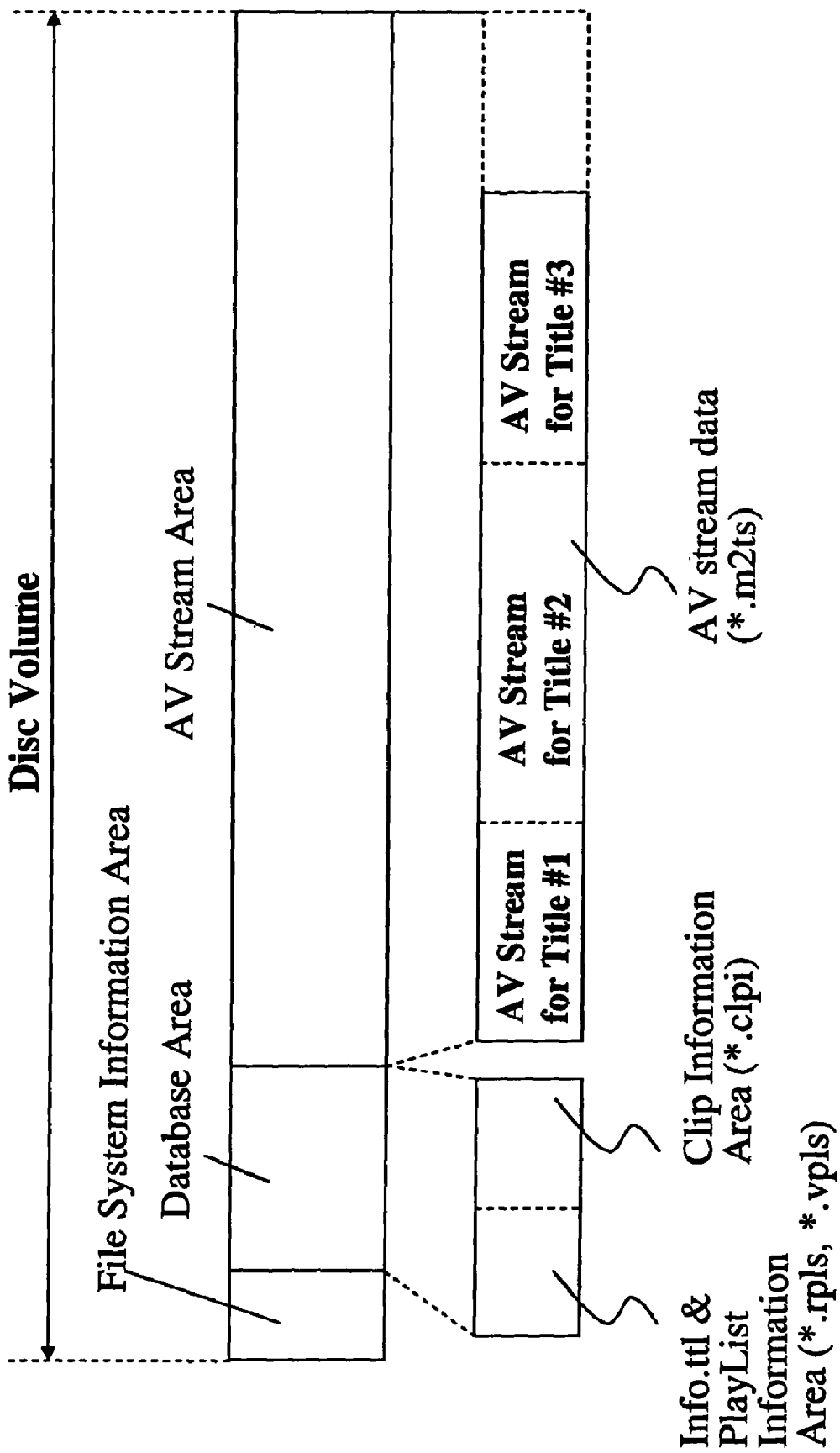
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the TITLE directories are recorded in one or more title directory areas, the general information file is recorded in one or more general information areas within the title directory area, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a title directory and playlist information area and a clip information area. The title directory and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Figure 4:
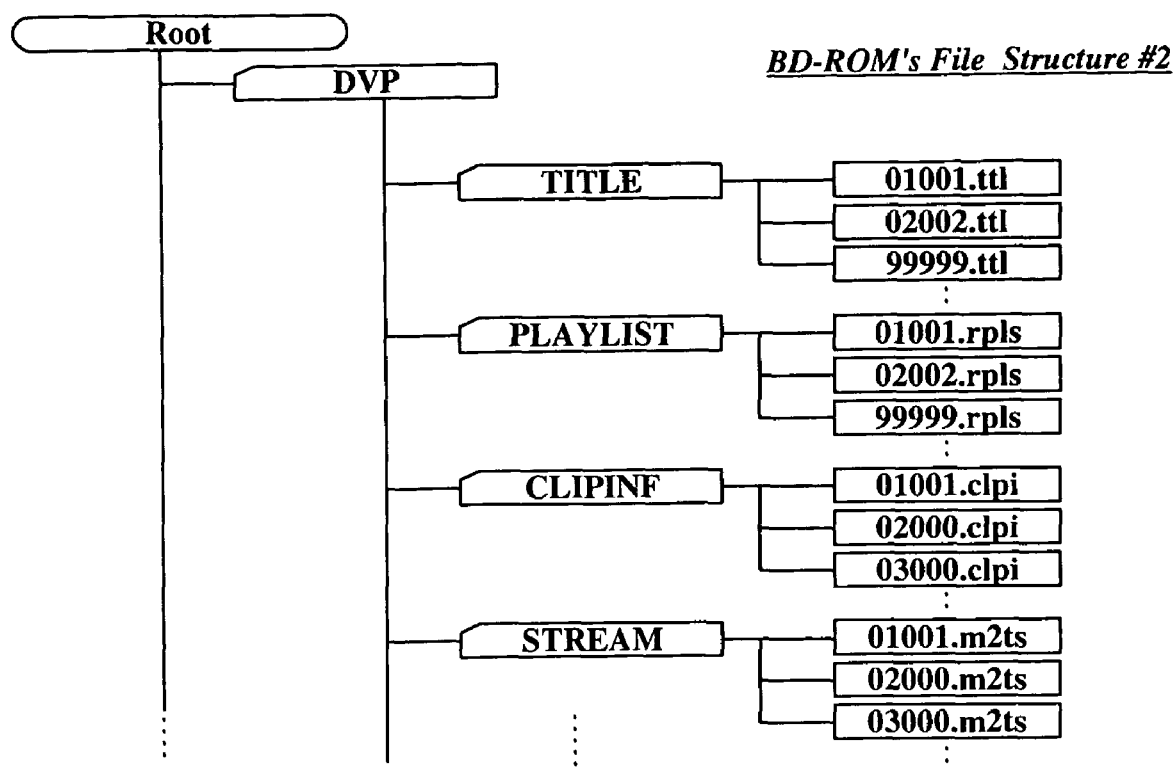

FIG. 4 illustrates another data structure according to an embodiment of the present invention. As shown, in this embodiment, the DVP directory includes a single TITLE directory. The TITLE directory includes a general information file *.ttl for each title of video data recorded on the recording medium. The general information files *.ttl are the same as the general information file info.ttl discussed above with respect to FIG. 2. As further shown in FIG. 4, the DVP directory includes a single PLAYLIST directory, CLIPINFO directory and STREAM directory. Unlike the embodiment of FIG. 2 where a PLAYLIST directory, CLIPINFO directory and STREAM directory were provided as sub-directories for each TITLE director, only a single PLAYLIST directory, CLIPINFO directory and STREAM directory is provided for all of the titles in FIG. 4. These directories contain the same information and files as described above with respect to FIG. 2, but do so for all of the titles, not just one title. As with FIG. 2, FIG. 4 represents areas of the recording medium, and FIG. 3 illustrates an exemplary embodiment of the recording medium including these areas.

As alluded to above, video and audio data are typically organized as individual titles; for example, different movies represented by the video and audio data are organized as different titles. Furthermore, a title may be organized into individual chapters in much the same way a book is often organized into chapters.

Figure 5:
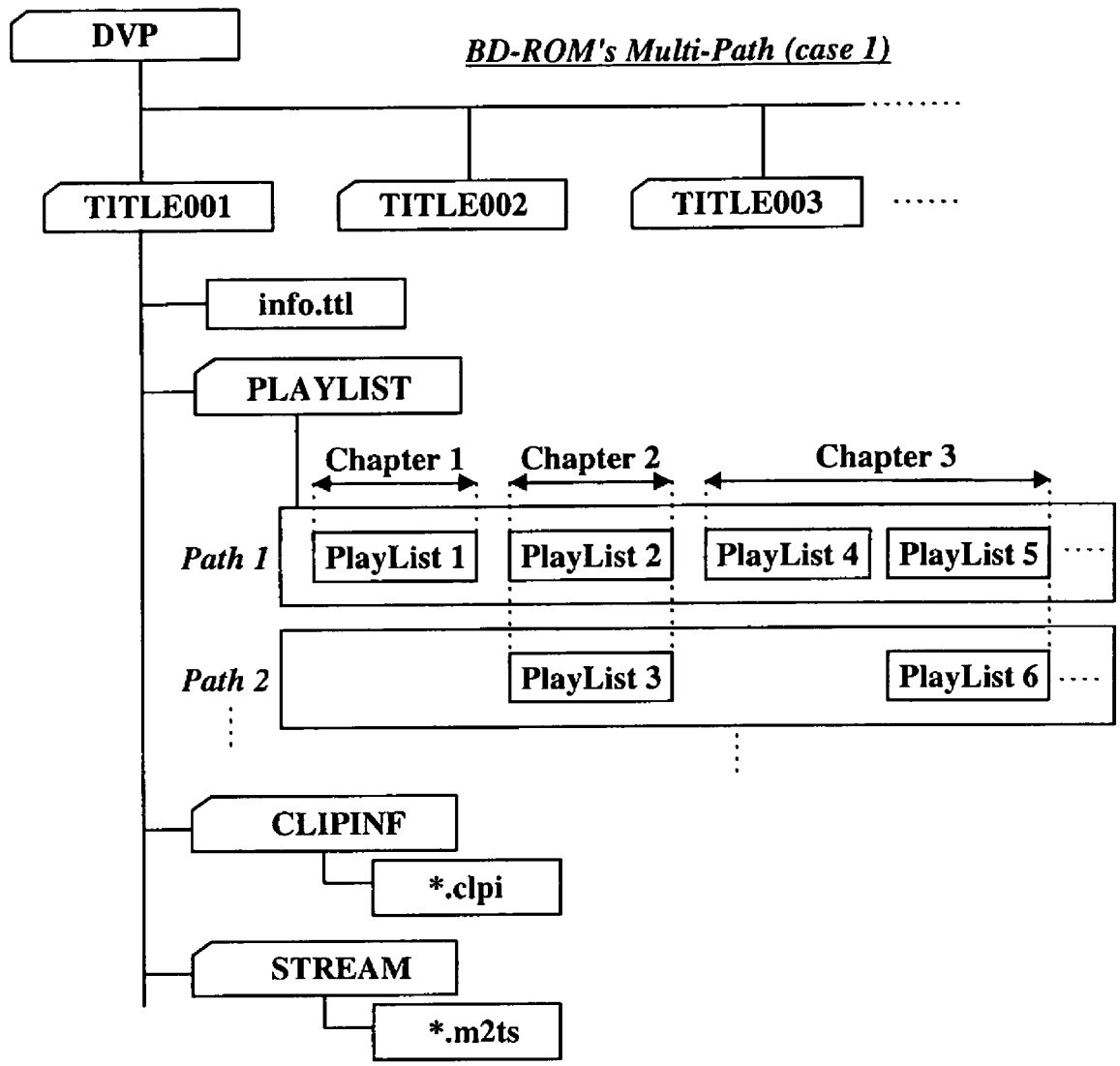

As shown in FIG. 5, and as will be described in greater detail below with respect to FIGS. 5-7, in one embodiment of the present invention, the general information file info.ttl for the data structure of FIG. 2 includes chapter management information for managing reproduction of a title by chapters.

Because of the large storage capacity of the newer, high-density recording media such as BD-ROM optical disks, various versions of a title or portions of a title may be recorded, and therefore, reproduced from the recording media. For example, video data representing different camera angles may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that camera angle and parental control versions are but two examples of multiple reproduction path video data, and the present invention is applicable to any type or combination of types of multiple reproduction path video data. As will be described in detail below with respect to FIGS. 5-7, in an embodiment of the present invention, the general information file info.ttl includes path management information for managing reproduction of multiple reproduction path video data recorded on the recording medium.

According to a first embodiment of the present invention, as illustrated in FIG. 5, each chapter in a title may be linked with at least one playlist, and the playlists belong to one or more reproduction paths. In the example of FIG. 5, the first playlist 'PlayList 1' refer to the first chapter, the second and third playlists 'PlayList 2' and 'PlayList 3' refer to the second chapter, and the fourth-sixth playlists 'PlayList 4', 'PlayList 5' and 'PlayList 6' refer to the third chapter. Also, FIG. 5 shows a first reproduction path is indicated by the first, second, fourth and fifth playlists 'PlayLists 1, 2, 4 and 5' and a second reproduction path is indicated by the third and sixth playlists 'PlayLists 3 and 6'. This is merely an example, and is not limiting on the path structure permitted by the present invention. For example, a playlist may be associated with more than one reproduction path.

FIG. 6 illustrates a portion of the general information file info.ttl according to an embodiment of the present invention in greater detail. As shown, the general information file info.ttl includes an information field called 'TableOfPlaylists'. The playlist table 'TableOfPlaylists' indicates the length of the information field, and the number playlists in the PLAYLIST directory of the same title. For each playlist, the playlist table 'TableOfPlaylists' indicates the file name 'PlayList_file_name' of the playlist (which identifies the playlist), a chapter entry flag 'Chapter_entry_flag' and a path number 'Path_number'. The chapter entry flag 'Chapter_entry_flag' provides chapter management information by indicating whether the associated playlist is the start of a chapter. The path number 'Path_number' provides the path management information by indicating the path or paths to which the associated playlist belongs.

The chapter management information also, optionally, includes a chapter entry table 'ChapterEntryTable' forming a portion of the general information file 'info.ttl' as shown in FIG. 7. As shown, the chapter entry table indicates the length of this information field, indicates the number of chapters 'number_of_Chapters', and for each chapter, indicates the filenames of the first playlist 'Entry_PlayList_file_name' associated with the chapter. In an alternate embodiment, the chapter entry table is written in a file separate from the general information file 'info.ttl'.

While the embodiment of FIGS. 5-7 has been described with respect to the data structure of FIG. 2, it will be appreciated that the embodiment of FIGS. 5-7 is equally applicable to the embodiment of FIG. 4.

Figure 8:
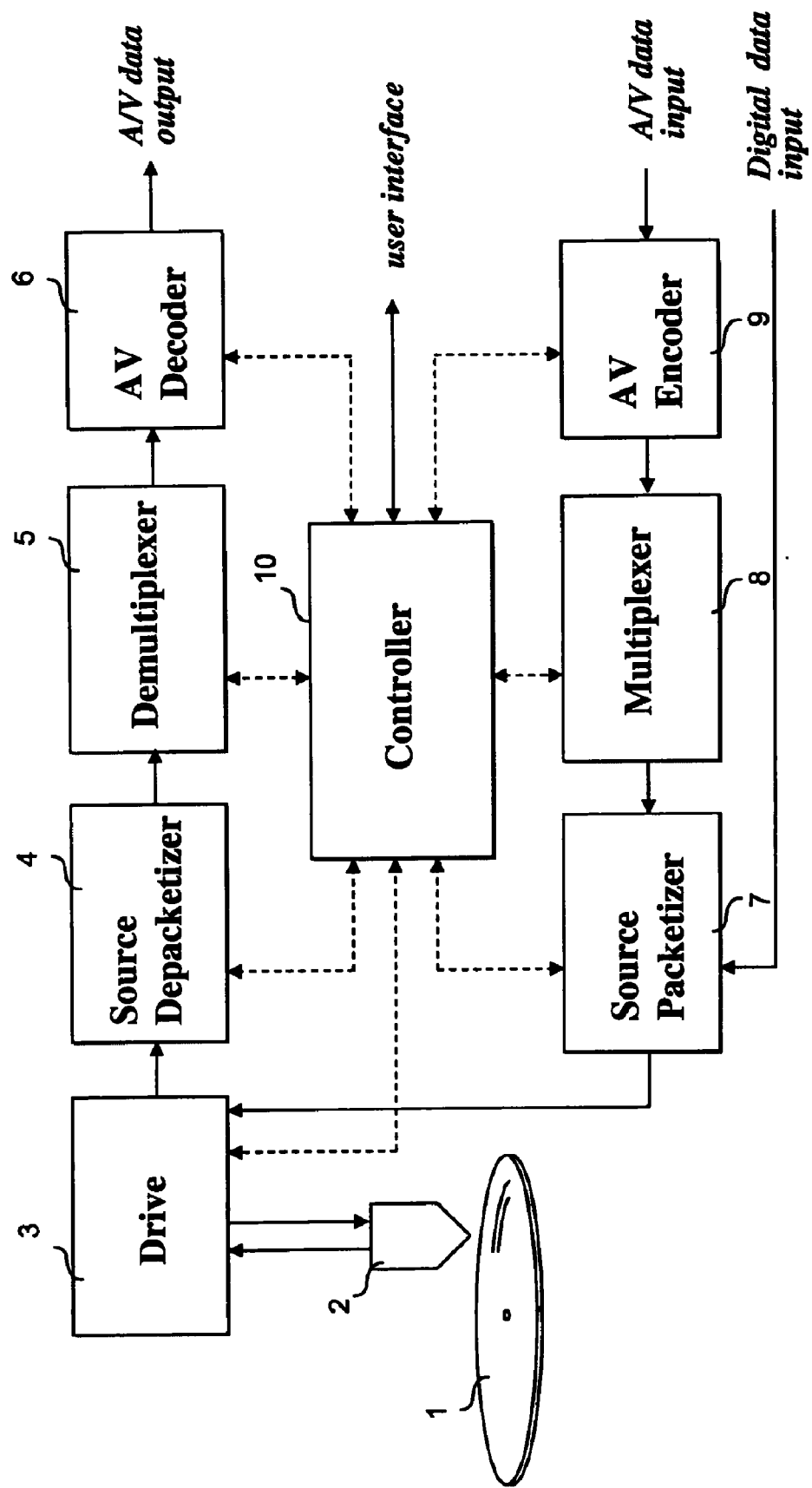
FIG. 8 illustrates a schematic diagram of an embodiment of an optical disk recording and reproduction apparatus of the present invention.

FIG. 8 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 6, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2, 5-7 or FIGS. 4-7 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a title, chapter, and/or path to reproduce. This user input may be specified, for example, via a menu based graphical user interface preprogrammed into the controller 10. Using the user input and the TITLE directories (FIG. 2) and/or general information files (FIGS. 2 and 4), chapter management information and/or path management information reproduced from the optical disk, the controller 10 controls the reproduction of the specified title, chapter and/or path.

For example, to select a particular title, the controller 10 determines from the number of TITLE directories in FIG. 2 or the number of general information files in FIG. 4 the number of titles and requests the user to select one based on the number. As will be appreciated, the general information files may be augmented to contain more meaningful information (such as a title name) for the titles recorded on the recording medium, and this information could be provided to the user in conjunction with the title selection request. Once a title is selected, the playlist file names for the selected title are obtained from the table of playlists in the general information file for the selected title and reproduction according to the identified playlists is performed.

To select a particular chapter, the chapter entry flag for each playlist is examined by the controller 10 to determine the number of chapters and the user is queried on which chapter to reproduce. As with the title selection, the chapter management information may be augmented to provide more meaningful information regarding the chapters. Selection of a particular chapter is a selection to begin reproduction at the associated playlist, and reproduction begins with the associated playlist.

To select a particular path, the path numbers for each playlists are examined by the controller 10 to determine the number of reproduction paths, and the user is requested which path to reproduce. As with the title and chapter selections, the path management information may be augmented to provide more meaningful information regarding the reproduction path to reproduce. During reproduction, only those playlists having the selected path number as one of their path numbers are reproduced.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 8 has been described as a recording and reproducing apparatus, it will be understood that only a recording or only a reproducing apparatus may be provided using those portions of FIG. 8 providing the recording or reproducing function.

Figure 9:
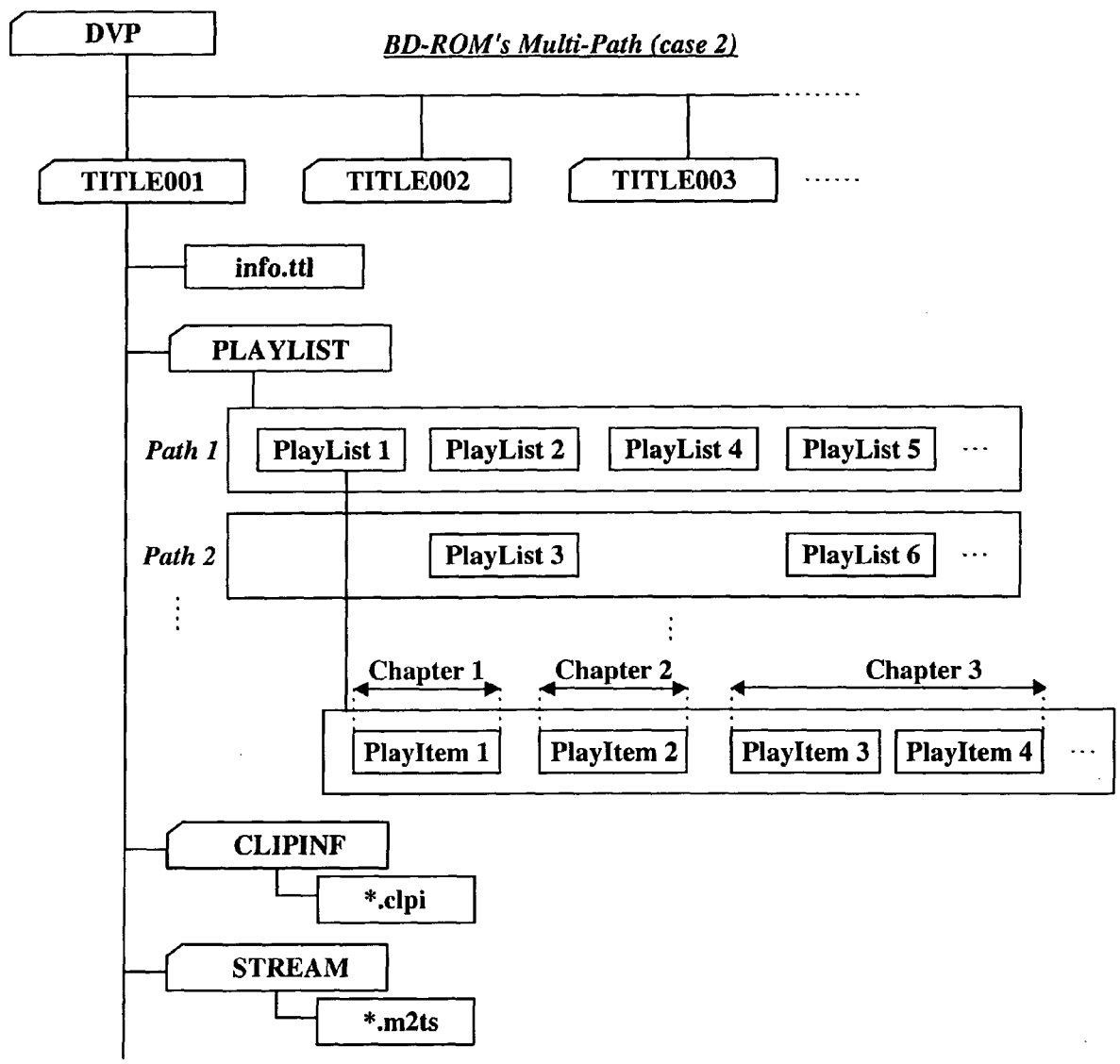

FIGS. 9-12 illustrate a second embodiment of the data structure according to the present invention. As shown in FIG. 9, the data structure of the second embodiment is the same as the data structure of FIG. 5, except for the chapter management information. As with FIG. 2, FIG. 7 also represents the areas of the recording medium, and FIG. 3 illustrates an exemplary embodiment of the recording medium including these areas. FIG. 9 illustrates that the chapter management information indicates chapters at the playitem level. As shown, in the first playlist 'PlayList 1', the first playitem 'PlayItem 1' refers to chapter 1, the second playitem 'PlayItem 2' refers to the second chapter and the third and fourth playitems 'Playitem 3' and 'PlayItem 4' refer to the third chapter.

Figure 10:
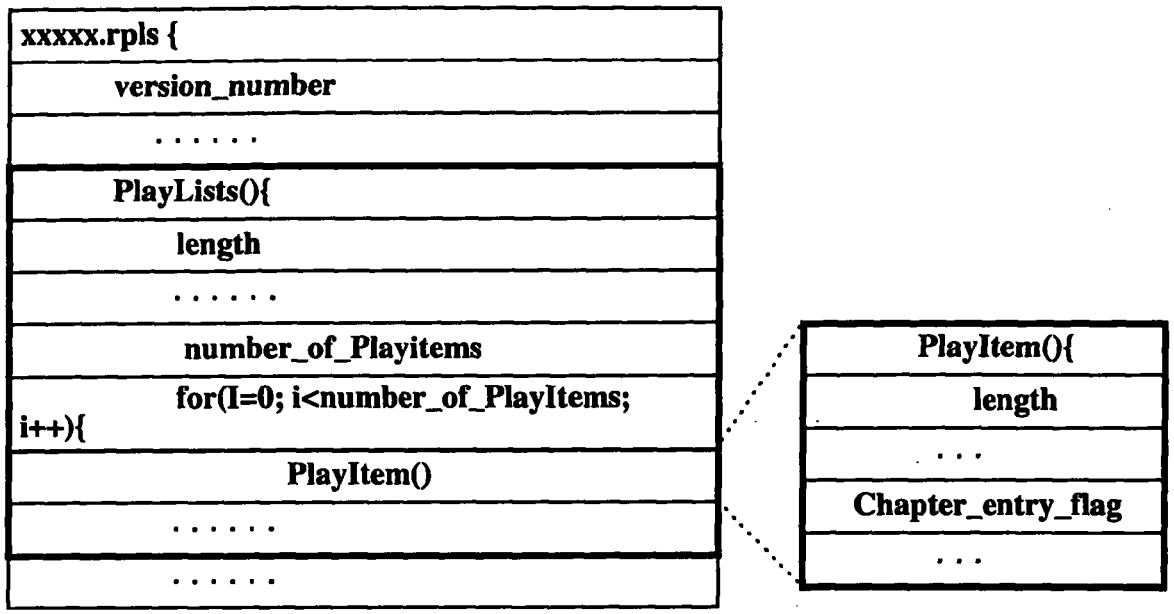

In this embodiment, the playlist files include the chapter management information. FIG. 10 illustrates a portion of a playlist file including the chapter management information according to this embodiment. As shown, each playlist file indicates a length of the file, and the number of playitems 'number_of_PlayItems' forming the playlist. For each playitem, a playitem information field is provided in the playlist file. Here each playitem is identified by the number of the playitem. As shown in FIG. 10, the playitem information field includes, in part, an indication of the field's length and a chapter entry flag 'Chapter_entry_flag'. The chapter entry flag 'Chapter_entry_flag' provides chapter management information by indicating whether the associated playitem is the start of a chapter.

Figure 11:
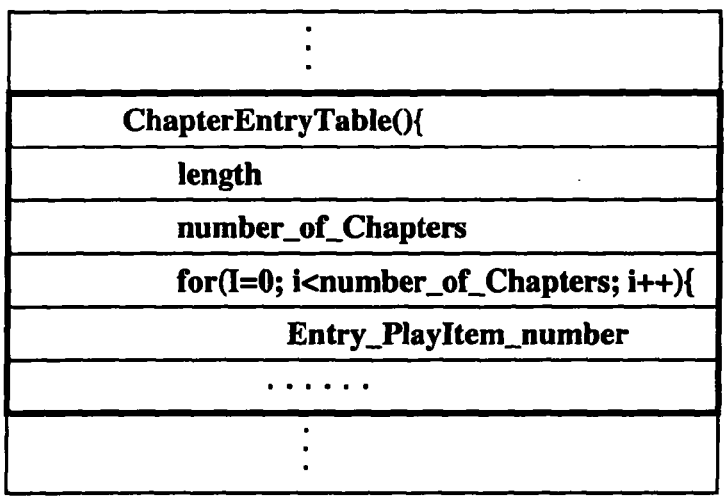

The chapter management information also, optionally, includes a chapter entry table 'ChapterEntryTable' forming a portion of the playlist file as shown in FIG. 11. As shown, the chapter entry table indicates the length of this information field, indicates the number of chapters 'number_of_Chapters', and for each chapter, indicates the file names of the first playitem 'Entry_PlayItem_number' associated with the chapter. In an alternate embodiment, the chapter entry table is written in a file separate from the playlist file.

FIG. 12 illustrates a portion of the general information file info.ttl for the embodiment of FIGS. 9-12. As shown, the general information file info.ttl includes an information field called 'TableOfPlaylists'. The playlist table 'TableOfPlaylists' indicates the length of the information field, and the number playlists in the PlayList directory of the same title. For each playlist, the playlist table 'TableOfPlaylists' indicates the file name 'PlayList_file_name' of the playlist (which identifies the playlist), and a path number 'Path_number'. The path number 'Path_number' provides the path management information by indicating the path or paths to which the associated playlist belongs.

The recording and reproducing apparatus of FIG. 8 operates in the same manner with respect to the embodiment of FIGS. 9-12 as was described above with respect to FIGS. 5-7. However, with respect to the embodiment FIGS. 9-12, the chapter management information of FIG. 10 is recorded and used during reproduction to selectively begin reproduction at a particular chapter.

Figure 13:
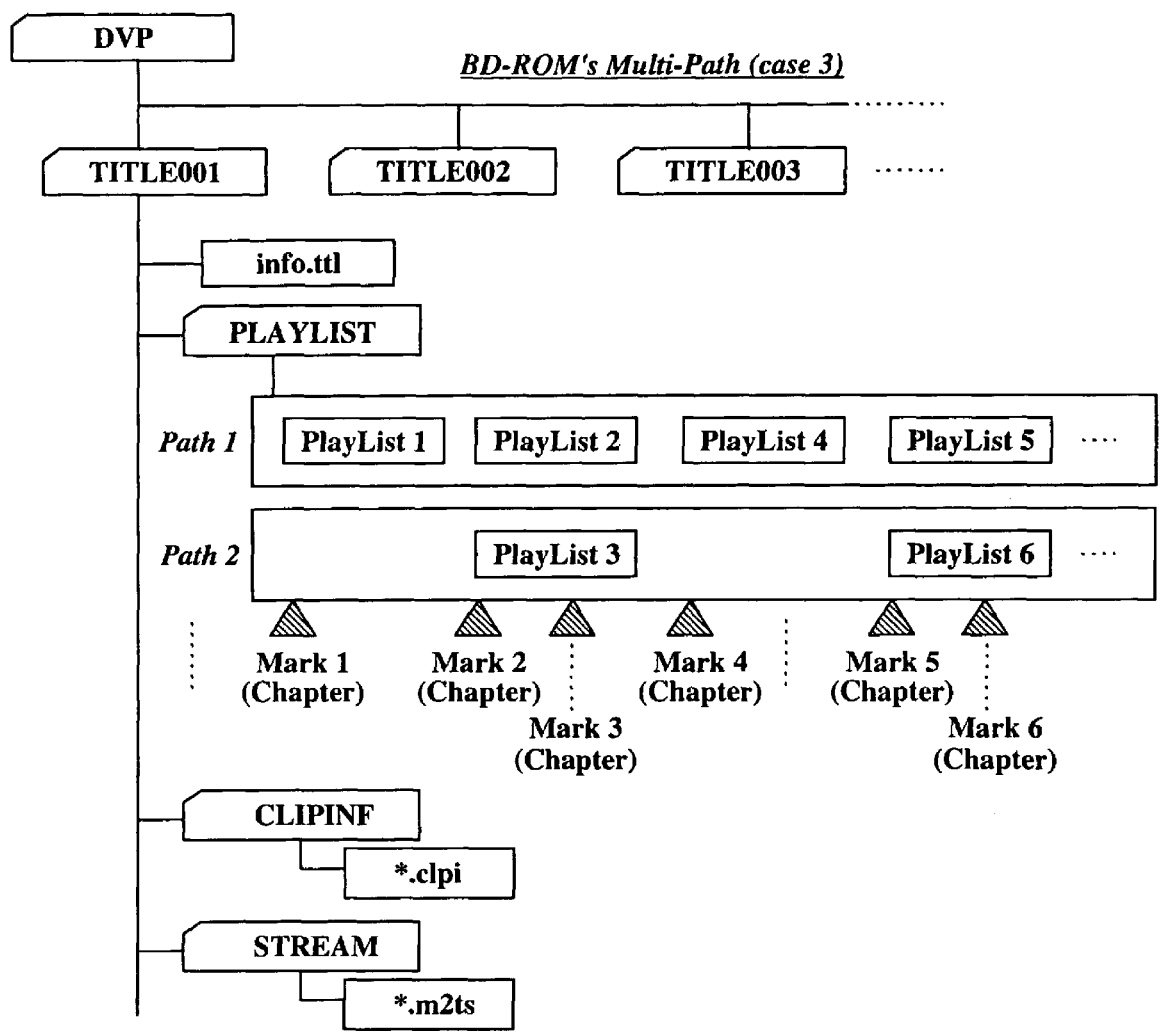

FIGS. 13-14 illustrate a third embodiment of the data structure according to the present invention. As shown in FIG. 13, the data structure of the third embodiment is the same as the data structure of FIG. 5, except for the chapter management information. As with FIG. 5, FIG. 13 also represents the areas of the recording medium, and FIG. 3 illustrates an exemplary embodiment of the recording medium including these areas. FIG. 13 illustrates that the chapter management information indicates chapters through the use of chapter marks. In FIG. 13, the first, second, fourth and fifth playlists 'PlayList 1', 'PlayList 2', 'PlayList 4' and 'PlayList 5' are associated with a first reproduction path and the third and sixth playlists 'PlayList 3' and 'PlayList 6' are associated with a second reproduction path. A first chapter mark is linked to the first playlist 'PlayList 1', second and third chapter marks are linked to the second and third playlists 'PlayList 2' and 'PlayList 3', a fourth chapter mark is linked to the fourth playlist 'PlayList 4', and fifth and sixth chapter marks are linked to the fifth and sixth playlists 'PlayList 5' and 'PlayList 6'. In this embodiment, each chapter is linked to one chapter mark, but the present invention is not limited to this implementation.

In this embodiment, the playlist files include the chapter management information. FIG. 14 illustrates a portion of a playlist file including the chapter management information according to this embodiment. As shown, each playlist file includes a playlist mark 'PlayListsMark' information field. The playlist mark 'PlayListsMark' information field indicates a length of the information field and a number of the playlist marks 'number_of PlayList_marks' in the playlist. For each playlist mark, the playlist mark 'PlayListsMark' information field indicates the mark type 'mark_type', the mark name length 'mark_name_length', the maker 'maker_ID', an indicator of the playitem on which the mark is placed 'ref_to_PlayItem_id', a time stamp 'mark_time_stamp', and a duration 'duration' of the mark.

The mark type indicates the type of mark. For example, when a mark indicates the beginning of a chapter, the mark type 'mark_type' identifies the associated mark as a chapter mark. The mark name length 'mark_name_length' indicates the length (in bytes) of the mark name. The maker identifier 'maker_ID' identifies the manufacturer of the mark. The playitem indicator 'ref_to_PlayItem_id' indicates the PlayItem_id value for a playitem on which the mark is placed. The time stamp 'mark_time_stamp' of the mark indicates a point where the mark is placed; namely, indicates a point on a time axis of the A/V stream of clips (e.g., ATC and/or STC basis) where the mark is placed. The duration 'duration' indicates a length of the mark that start from the time stamp 'mark_time_stamp'.

Because the playlist mark information field provides the chapter management information, the chapter entry flag 'Chapter_entry_flag' of the first embodiment is not required.

Furthermore, in this third embodiment, the path management information is provided as described above with respect to FIG. 12 and the second embodiment of the present invention.

The recording and reproducing apparatus of FIG. 8 operates in the same manner with respect to the embodiment of FIGS. 13-14 as was described above with respect to FIGS. 5-7. However, with respect to the embodiment FIGS. 13-14, the chapter management information of FIG. 14 is recorded and used during reproduction to selectively begin reproduction at a particular chapter. Here, the controller 10 determines the number of chapters in a title based on the number of playlist marks identified as chapter marks, queries the user to select a chapter, and begins reproduction of the video data at the point indicated by the time stamp associated with the chapter mark of the selected chapter.

Figure 17:
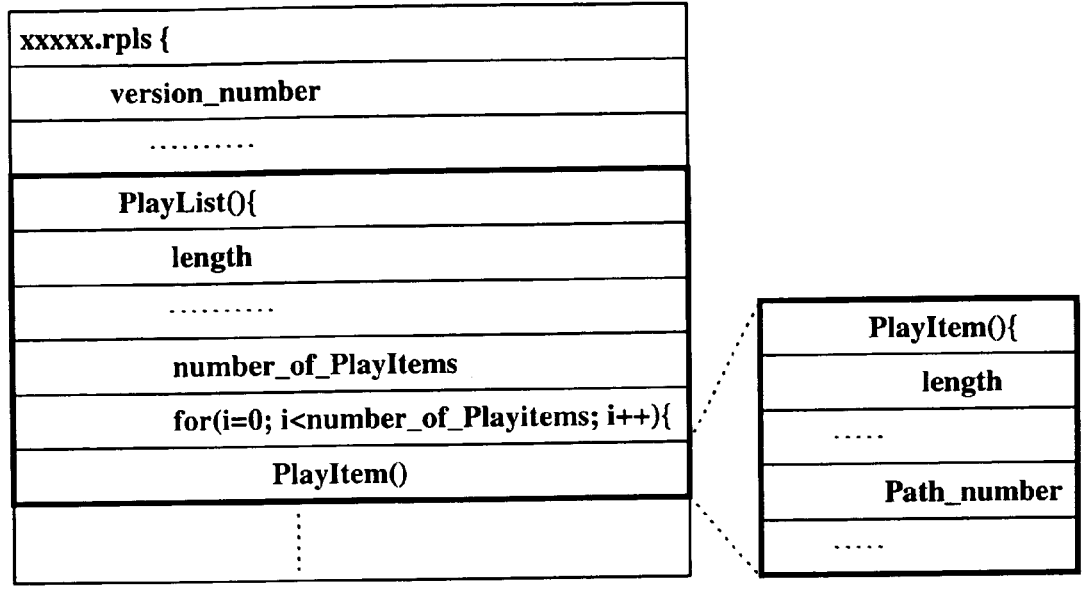

FIGS. 15-17 illustrate a fourth embodiment of the data structure according to the present invention. As shown in FIG. 15, the data structure of the fourth embodiment adopts the data structure of FIG. 2. As with FIG. 2, FIG. 15 also represents the areas of the recording medium, and FIG. 3 illustrates an exemplary embodiment of the recording medium including these areas.

As illustrated in FIG. 15, each chapter may be associated with a single playlist in the PLAYLIST directory. Also, FIG. 15 shows a first production path includes the odd playitems 'PlayItem 1, 3, 5, 7' from the first playlist 'PlayList 1' and a second reproduction path includes the even playitems 'PlayItem 2, 4, 6, 8' of the first playlist 'PlayList 1'. This is merely an example, and is not limiting on the path structure permitted by the present invention.

FIG. 16 illustrates a portion of the general information file info.ttl according to an embodiment of the present invention in greater detail. As shown, the general information file info.ttl includes an information field called 'TableOfPlaylists'. The playlist table 'TableOfPlaylists' indicates the length of the information field, and the number playlists in the PLAYLIST directory associated with the same title. For each playlist, the playlist table 'TableOfPlaylists' indicates the file name 'PlayListfile_name' of the playlist (which identifies the playlist) and chapter management information associated with the playlist. Specifically, the chapter management information is a chapter entry flag 'Chapter_entry_flag', which indicates whether the playlist is the start of a chapter. In the exemplary embodiment of FIG. 15 where each chapter is associated with a single playlist, the chapter entry flag 'Chapter_entry_flag' is set for each playlist. However, it will be understood that the present invention is not limited to this embodiment.

The chapter management information may also include a chapter entry table 'ChapterEntrTable' forming a portion of the general information file 'info.ttl' as described in detail above with respect to FIG. 7.

FIG. 17 shows an exemplary embodiment where path management information, which is used for managing the reproduction of multiple reproduction path video data of a title, is written in the playlist file.

As shown, each playlist file indicates a length of the file, and the number of playitems 'number_of_PlayItems' forming the playlist. For each playitem, a playitem information field is provided in the playlist file. Here each playitem is identified by the number of the playitem. As shown in FIG. 17, the playitem information field includes, in part, an indication of the field's length and a path number 'Path_number'. The path number 'Path_number' provides the path management information by indicating the path or paths to which the associated playitem belongs.

The recording and reproducing apparatus of FIG. 8 operates in the same manner with respect to the embodiment of FIGS. 15-17 as was described above with respect to FIGS. 5-7. However, with respect to the embodiment FIGS. 15-17, the chapter and path management information of FIGS. 16 and 17 are recorded and used during reproduction to selectively begin reproduction at a particular chapter and/or along a particular reproduction path.

Figure 18:
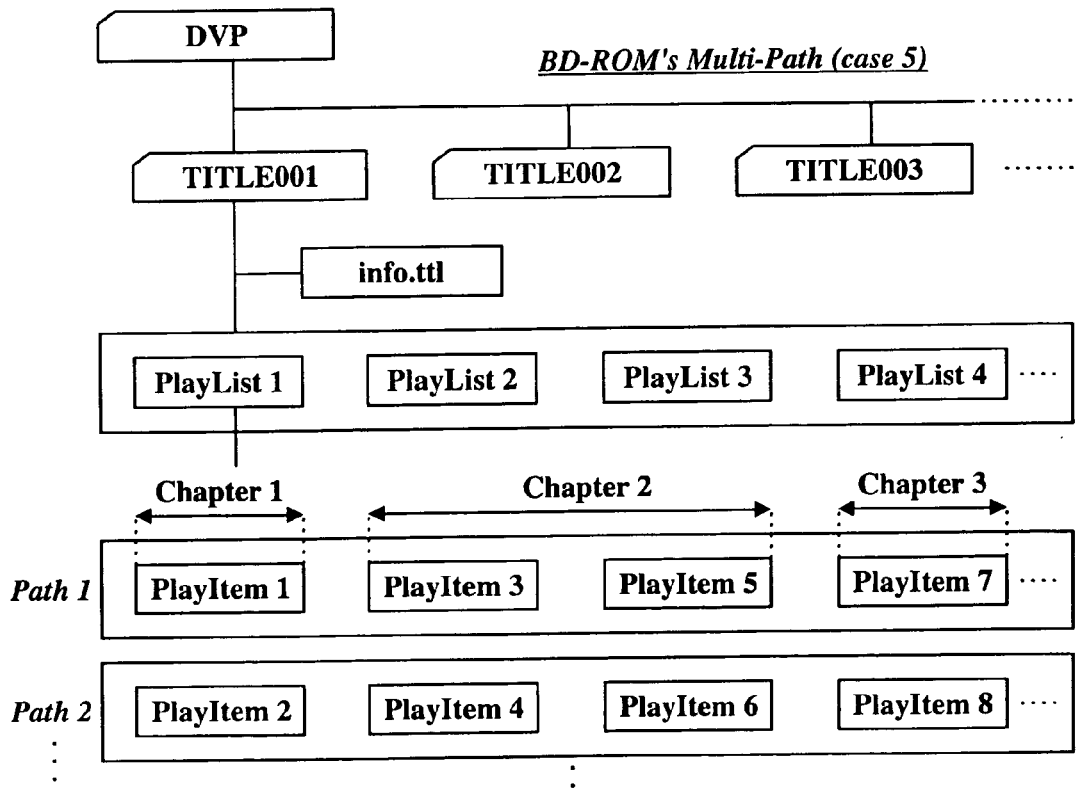
FIGS. 18-19 illustrate a fifth detailed embodiment of a file or data structure according to FIG. 2.
Figure 19:
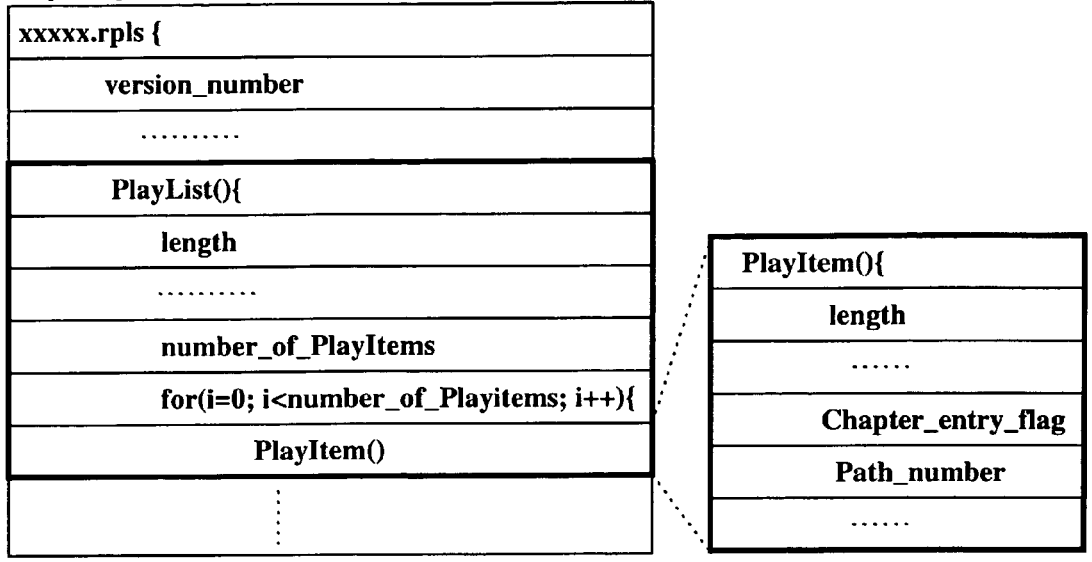

FIGS. 18-19 illustrate a fifth embodiment of the data structure according to the present invention. As shown in FIG. 18, the data structure of the fifth embodiment adopts the data structure of FIG. 2. As with FIG. 2, FIG. 18 also represents the areas of the recording medium, and FIG. 3 illustrates an exemplary embodiment of the recording medium including these areas. As will be described in detail below with respect to FIGS. 18-19, in an embodiment of the present invention, each playlist file includes chapter management information for managing reproduction of the title of video data by chapter and path management information for managing the reproduction of multiple reproduction path video data recorded on the recording medium.

As illustrated in FIG. 18, each chapter in a title may be linked with at least one playitem included in a playlist. In the example of FIG. 18, the first and the second playitems 'PlayItem 1' and 'PlayItem 2' among playitems included in the first playlist 'PlayList 1' refer to the first chapter, the third to the sixth playitems 'PlayItem 3'-'PlayItem 6' refer to the second chapter, and the seventh and the eight playitems 'PlayItem 7' and 'PlayItem 8' refer to the third chapter. Also, FIG. 18 shows a first production path is indicated by the odd playitems 'PlayItem 1, 3, 5, 7' and a second reproduction path is indicated by the even playitems 'PlayItem 2, 4, 6, 8'. This is merely an example, and is not limiting on the path structure permitted by the present invention.

The chapter and path management information are written in a corresponding playlist file structured as shown in FIG. 19. As shown, each playlist file indicates a length of the file, and the number of playitems 'number_of_PlayItems' forming the playlist. For each playitem, a playitem information field is provided in the playlist file. Here each playitem is identified by the number of the playitem. As shown in FIG. 19, the playitem information field includes, in part, an indication of the field's length, a chapter entry flag 'Chapter_entry_flag' and a path number 'Path_number'. The chapter entry flag 'Chapter_entry_flag' provides chapter management information by indicating whether the associated playitem is the start of a chapter. The path number 'Path_number' provides the path management information by indicating the path or paths to which the associated playitem belongs.

The chapter management information may also include a chapter entry table 'ChapterEntryTable' forming a portion of the playlist file as described in detail above with respect to FIG. 11.

The recording and reproducing apparatus of FIG. 8 operates in the same manner with respect to the embodiment of FIGS. 18-19 as was described above with respect to FIGS. 5-7. However, with respect to the embodiment FIGS. 18-19, the chapter and path management information of FIG. 19 are recorded and used during reproduction to selectively begin reproduction at a particular chapter and/or along a particular reproduction path.

Figure 20:
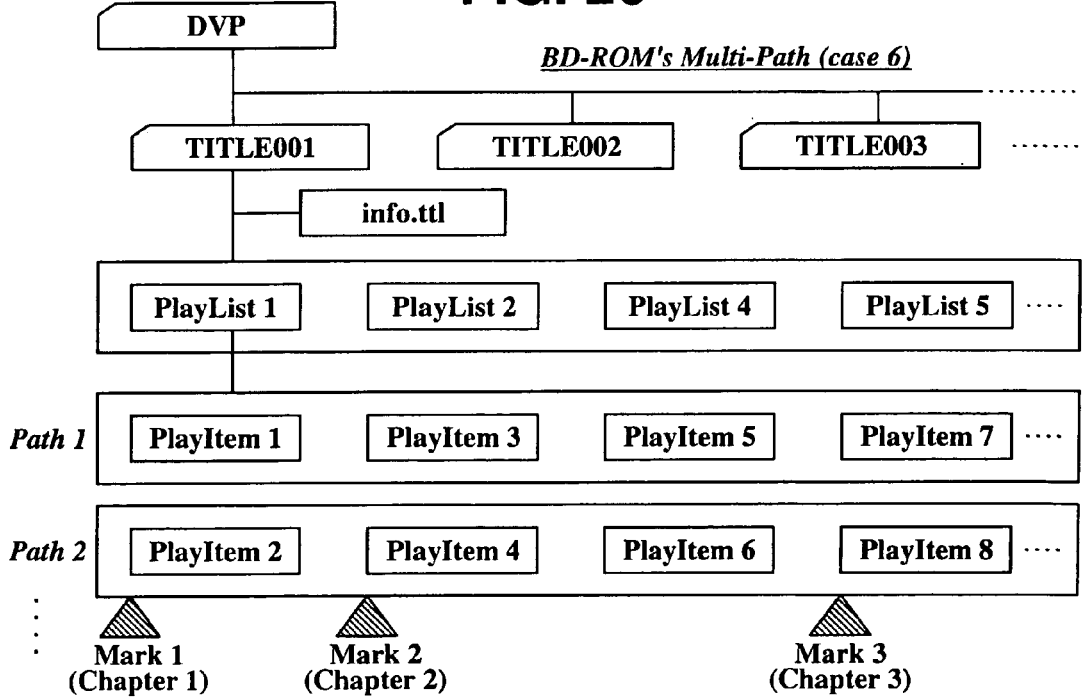
FIG. 20 illustrates a sixth detailed embodiment of a file or data structure according to FIG. 2.

FIG. 20 illustrates a sixth embodiment of the data structure according to the present invention. As shown in FIG. 20, the data structure of the sixth embodiment is the same as the data structure of FIG. 18, except for the chapter management information. As with FIG. 18, FIG. 20 also represents the areas of the recording medium, and FIG. 3 illustrates an exemplary embodiment of the recording medium including these areas. FIG. 20 illustrates that the chapter management information indicates chapters through the use of chapter marks. More specifically, the playlist files include the chapter management information in the same manner as described in detail above with respect to FIG. 14. Additionally, the playlist files include the path management information in the same manner as described in detail above with respect to FIG. 17.

The recording and reproducing apparatus of FIG. 8 operates in the same manner with respect to the embodiment of FIG. 20 as was described above with respect to FIGS. 5-7. However, with respect to the embodiment of FIG. 20, the chapter and path management information of FIGS. 14 and 17, respectively are recorded and used during reproduction to selectively begin reproduction at a particular chapter and/or along a particular reproduction path.

As the sixth embodiment of FIG. 20 demonstrates, the different data structures for chapter reproduction management and path reproduction management in the above described embodiments may be combined to form further embodiments of the present invention.

Furthermore, the embodiments of the present invention have been described as applied to the data structure of FIG. 2; however, it will be appreciated that these embodiments are also applicable to the data structure of FIG. 4.

As will be appreciated from the forgoing disclosure, the present invention provides a recording medium having a file or data structure that permits managing the reproduction of video data on a title, chapter, and or multiple reproduction path basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk, the present invention is not limited to this standard of optical disk or to optical disks. It is intended that all such modifications and variations fall within the spirit and scope of the invention.

What is claimed is:

1. A recording medium having an executable data structure for managing reproduction of video data by a reproducing device, the video data having multiple reproduction paths, the recording medium comprising:

a path management area storing a path management information file including path management information for managing reproduction of the video data by the reproducing device, the path management information indicating a playlist belonging to a reproduction path of the video data; and a playlist area storing a playlist file including the playlist, the playlist file being a separate file from the path management information file, the playlist including at least one playitem, the playitem identifying a playing interval in a clip of the video data, the playitem including a pair of IN-point information and OUT-point information that point to positions on a time axis of the clip, wherein the playlist file includes a playlist mark information field for at least one playlist mark, the playlist mark indicating a point of the video data and the beginning of a chapter, the playlist mark information field including a playitem indicator indicating the playitem on which the playlist mark is placed.

2. The recording medium of claim 1, wherein the playlist mark information field includes a time stamp indicating a point in time where the playlist mark is placed.

3. A method of recording a data structure for managing reproduction of video data on a recording medium, the method comprising:

recording, by a controller, a path management information file including path management information in the recording medium, the path management information for managing reproduction of the video data, the path management information indicating a playlist belonging to a reproduction path of the video data; and recording, by the controller, a playlist file including the playlist the recording medium, the playlist file being a separate file from the path management information file, the playlist including at least one playitem, the playitem identifying a playing interval in a clip of the video data, the playitem including a pair of IN- point information and OUT-point information that point to positions on a time axis of the clip, the playlist file including a playlist mark information field for at least one playlist mark, the playlist mark indicating a point of the video data and a beginning of a chapter, the playlist mark information field including a playitem indicator indicating the playitem on which the playlist mark is placed.

4. A method of reproducing a data structure for managing reproduction of video data having multiple reproduction paths, the method comprising:

reproducing, by a controller, a path management information file including path management information from a recording medium, the path management information for managing reproduction of the video data recorded on the recording medium, the path management information indicating a playlist belonging to a reproduction path of the video data; and reproducing, by the controller, a playlist file including the playlist from the recording medium, the playlist file being a separate file from the path management information file, the playlist including at least one playitem, the playitem playing an interval in a clip of the video data, the playitem including a pair of IN-point information and OUT-point information that point to positions on a time axis of the clip, the playlist file including a playlist mark information field for at least one playlist mark, the playlist mark indicating a point of the video data and a beginning of a chapter, a playlist mark information field including a playitem indicator indicating the playitem on which the playlist mark is placed.

5. An apparatus for recording a data structure for managing reproduction of video data having multiple reproduction paths, the apparatus comprising:
   a recording unit configured to record data on a recording medium; and
   a controller, operably coupled to the recording unit, configured to control the recording unit to record video data on the recording medium,
   wherein the controller is configured to control the recording unit to record a path management information file including path management information in the recording medium, the path management information for managing reproduction of the video data, the path management information indicating a playlist file belonging to a reproduction path of the video data, and
   the controller is configured to control the recording unit to record the playlist file in the recording medium, the playlist file being a separate file from the path management information file, the playlist file including at least one playitem, the playitem identifying a playing interval in a clip of the video data, the playitem including a pair of IN-point information and OUT-point information that point to positions on a time axis of the clip, the playlist file including a playlist mark information field for at least one playlist mark, the playlist mark indicating a point of the video data and the beginning of a chapter, the playlist mark information field including a playitem indicator indicating the playitem on which the playlist mark is placed.

6. An apparatus for reproducing a data structure for managing reproduction of video data having multiple reproduction paths, the apparatus comprising:
   a reproducing unit configured to reproduce data recorded on a recording medium; and
   a controller, operably coupled to the reproducing unit, configured to control the reproducing unit to reproduce a path management information file including path management information from the recording medium, the path management information for managing reproduction of the video data recorded on the recording medium, the path management information indicating a playlist belonging to a reproduction path of the video data,
   wherein the controller is configured to control the reproducing unit to reproduce the playlist file from the recording medium, the playlist file being a separate file from the path management information file, the playlist including at least one playitem, the playitem identifying a playing interval in a clip of the video data, the playitem including a pair of IN-point information and OUT-point information that point to positions on a time axis of the clip, the playlist file includes a playlist mark information field for at least one playlist mark, the playlist mark indicating a point of the video data and a beginning of a chapter, the playlist mark information field including a playitem indicator indicating the playitem on which the playlist mark is placed.

7. The recording medium of claim 1, wherein the playlist mark information field includes information indicating a number of playlist marks included in the playlist file.

8. The method of claim 3, wherein the playlist mark information field includes a time stamp indicating a point in time where the playlist mark is placed.

9. The method of claim 3, wherein the playlist mark information field includes information indicating a number of playlist marks included in the playlist file.

10. The method of claim 4, wherein the playlist mark information field includes a time stamp indicating a point in time where the playlist mark is placed.

11. The method of claim 4, wherein the playlist mark information field includes information indicating a number of playlist marks included in the playlist file.

12. The method of claim 10, further comprising:
   determining chapter numbers in a title based on the number of the playlist marks;
   selecting a chapter based on the chapter numbers;
   beginning the reproduction of the video data from the point indicated by the time stamp associated with the playlist mark of the selected chapter.

13. The apparatus of claim 5, wherein the playlist mark information field includes a time stamp indicating a point in time where the playlist mark is placed.

14. The apparatus of claim 5, wherein the playlist mark information field includes information indicating a number of playlist marks included in the playlist file.

15. The apparatus of claim 6, wherein the playlist mark information field includes a time stamp indicating a point in time where the playlist mark is placed and the controller is configured to reproduce the video data from the point indicated in the time stamp.

16. The apparatus of claim 6, wherein the playlist mark information field includes information indicating a number of playlist marks included in the playlist file.

17. The apparatus of claim 15, wherein the controller is configured to control the reproducing unit to determine chapter numbers in a title based on the number of the playlist marks, select a chapter based on the chapter numbers, and begin the reproduction of the video data from the point indicated by the time stamp associated with the playlist mark of the selected chapter.

18. A recording medium having an executable data structure for managing reproduction of video data having multiple reproduction paths by a reproducing apparatus, the recording medium comprising:
   a path management area storing a path management information file including path management information for managing reproduction of the video data by the reproducing apparatus, the path management information indicating a playlist belonging to a reproduction path of the video data; and
   a playlist area storing a playlist file including the playlist, the playlist file being a separate file from the path management file, the playlist including at least one playitem, the playitem identifying a playing interval in a clip of the video data the playitem including a pair of IN-point information and OUT-point information that point to positions on a time axis of the clip,
   wherein the playlist file includes a playlist mark information field for at least one playlist mark, the playlist mark indicating the beginning of a chapter and the manufacturer of the playlist mark.

* * * * *

UNITED STATES PATENT AND TRADEMARK OFFICE
CERTIFICATE OF CORRECTION

| | | |
|---|---|---|
| PATENT NO. | : 7,835,622 B2 | Page 1 of 1 |
| APPLICATION NO. | : 10/456474 | |
| DATED | : November 16, 2010 | |
| INVENTOR(S) | : Kang Soo Seo et al. | |

It is certified that error appears in the above-identified patent and that said Letters Patent is hereby corrected as shown below:

In claim 3 at column 12, line 38, please change "playlist the recording medium" to --playlist on the recording medium--.

In claim 4 at column 13, line 3, please change "a playlist mark information" to --the playlist mark information--.

Signed and Sealed this
Twenty-fifth Day of January, 2011

David J. Kappos
*Director of the United States Patent and Trademark Office*